(No Model.)
J. H. PALM.
SAW TABLE GAGE.
No. 345,071. Patented July 6, 1886.
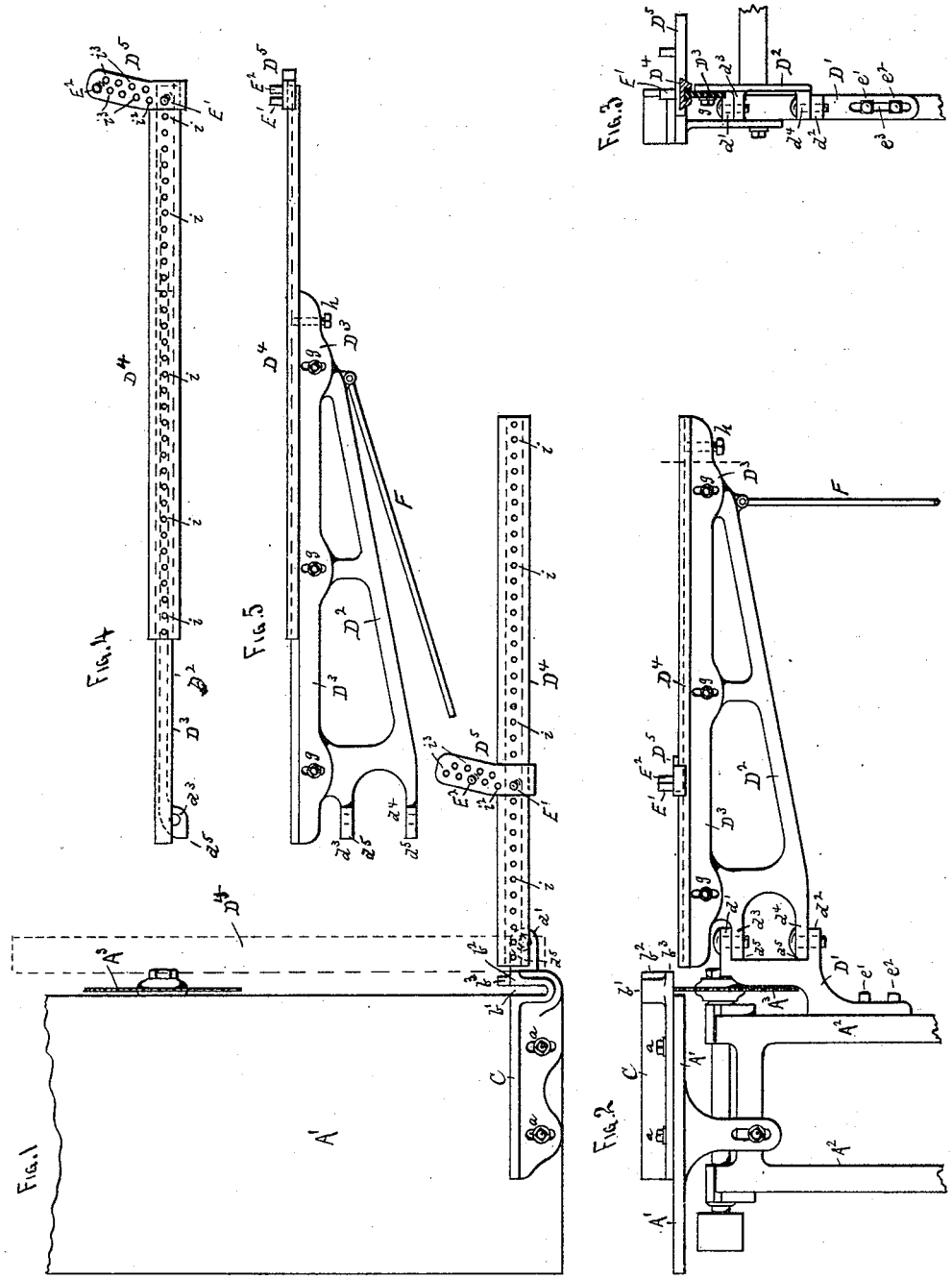
WITNESSES.
M.E. Keough
N.S. Webster
John Hisky Palm,
INVENTOR, BY
Charles N. Woodward,
Atty.

UNITED STATES PATENT OFFICE.

JOHN HISKEY PALM, OF MINNEAPOLIS, MINNESOTA.

SAW-TABLE GAGE.

SPECIFICATION forming part of Letters Patent No. 345,071, dated July 6, 1886.

Application filed October 27, 1885. Serial No. 181,111. (No model.)

*To all whom it may concern:*

Be it known that I, JOHN HISKEY PALM, a citizen of the United States, and a resident of Minneapolis, in the county of Hennepin and State of Minnesota, have invented certain new and useful Improvements in Saw-Table Gages, of which the following is a specification.

This invention relates to the tables of circular and other saws; and it consists in an adjustable gage attached thereto, by which the length of the lumber to be sawed may be determined, as hereinafter shown and described, and then specifically defined by the claims.

This device may be attached to nearly any form or construction of saw-table; but for the purpose of illustration I have shown it attached to an approved form of table in the drawings, in which—

Figure 1 represents a plan view, Fig. 2 represents a front view, and Fig. 3 represents a side view, of a portion of a saw-table with my improved gage shown arranged thereon. Fig. 4 is a plan view, and Fig. 5 is a side view, of the gage removed, and with its extension-bar drawn outward.

A' represents the saw-table, A² the supporting-legs, and A³ the saw. In this instance the table is stationary and the saw adapted to be moved back and forth through the lumber; but of course the gage is equally as applicable to a machine in which the saw is stationary and the table and the lumber adapted to be moved toward the saw.

C represents a rest, against which the rear edge of the lumber is adapted to be supported. This rest is adjustable by slots and set-screws $a$, as shown. The end of the rest next to the saw A³ projects beyond the edge of the table A', and is provided with a slot or recess, $b'$, in which the edge of the saw runs after it passes through the lumber. By this means a small portion, $b^2$, of the face of the rest occurs upon the outside of the saw, so that the lumber is supported upon both sides of the "cut," which effectually prevents "slivering" or splitting. To still further support the lumber outside the saw, I form on the lower edge of the portion $b^2$ of the rest C a lip or lug, $b^3$, the upper face of the lip being level with the upper face of the table C, so that it forms a support to the under side of the lumber being cut off.

D' is a bracket secured to the side of one of the legs A² by set-screws $e'$ $e^2$, tapped into the leg A² through a slot or slots, $e^3$, in the bracket D', so that the latter may be adjusted higher or lower on the leg. Upon the outer face of this bracket D' two ears, $d'$ $d^2$, are formed, adapted to support similar ears, $d^3$ $d^4$, on a gage-frame, D², this form of connection between the parts D' and D² enabling the frame D² to be swung around toward and parallel with the saw-table C (as indicated by dotted lines in Fig. 1) when not in use. Attached adjustably by set-screws $g$ to the upper edge of the frame D² is a horizontal plate, D³, the upper edge of this plate being "dovetailed," and adapted to receive and support a gage-plate, D⁴, having an internal groove dovetailed to correspond with the dovetail of the plate D³, so that the gage-plate D⁴ may be moved along the plate D³, while at the same time the dovetails prevent their separation.

$h$ is a set-screw tapped through the outer end of the plate D³, and adapted to be set up against the under side of the gage-plate D⁴, to firmly secure the latter to the former at any desired point.

In Figs. 1 and 2 the gage-plate D⁴ is shown set inward as far as it is ever intended that it shall be, and in Figs. 4 and 5 the gage-plate D⁴ is shown moved partially outward, the object to be hereinafter shown.

The edges of the gage-plate D⁴ are "undercut" or dovetailed and adapted to receive and support a slide or stop-plate, D⁵, the latter adapted to be moved along the gage-plate to any extent desired. In the upper face of the gage-plate D⁴, throughout its length, a series of holes, $i$, are formed one inch apart, and the stop-plate D⁵ has a corresponding hole, so that the stop-plate D⁵ may be moved along to any one of the holes $i'$, and there held by a pin, E', passing down through the hole in the stop-plate and into the required hole $i'$ in the gage-plate. Directly opposite the pin-hole of the pin E' in the stop D⁵ is another hole, $i^2$, in which a stop-pin, E², may be placed, and against which the end of the lumber being sawed will rest. The holes $i'$ will be numbered consecutively, beginning at the saw end of the gage-frame; hence by the operator setting the stop-pin E' in the hole $i'$ in the gage-frame numbered to correspond to the length in inches which he wishes the lumber to be cut, and setting the pin $E^2$ in the hole $i^2$, a stop will be formed against which the end of the lumber will rest to insure a uniform length of cut.

As thus far described, the stop $D^5$ is only available to cut even inches, and to cut the odd eighths or sixteenths of inches I form in the outer portion of the stop-plate $D^5$ a series of holes, $i^3$, representing eighths of inches. From center to center of the four holes $i^3$ on the side of the stop-plate next to the saw, in line at right angles to the frame $D^4$, the holes are one-fourth of an inch apart, while the center line of the three remaining holes will come midway between them; hence each one of the holes $i^3$ represents one-eighth of an inch. To illustrate: Suppose it is desired to cut a number of pieces of lumber eight and one-fourth inches long. The pin $E'$ is removed and the plate $D^5$ moved along until the hole therein comes above the hole $i'$ marked 8 in the gage, when the pin $E'$ will be set therein, and thus hold the plate fixed upon the gage-frame. The second hole, $i^3$, in the plate $D^5$, beyond the one in which the pin $E'$ sets, is one-eighth of an inch farther away from the saw than the first hole, $i^2$, (which, as before stated, is in line with the hole of the pin $E'$,) and the third hole, $i^3$, is one-fourth of an inch farther away from the saw than the first hole, $i^2$; hence if the pin $E^2$ be set in the latter hole and the end of the lumber to be cut placed against the pin $E^2$, then it will be cut off just eight and one-fourth inches long. Thus any length may be cut by adjusting the pins and plates properly upon the gage.

The gage-plate $D^4$ may be made of any length desired. In the drawings it is shown with thirty-four holes, or representing a gage adapted to cut lumber thirty-six inches long. The end $b^2$ of the rest C and the bracket $D'$ occupy the space of the first two holes $i'$ next the saw; hence there will always be two holes $i'$ less in number than the inches which the gage will cut. Thus in the drawings thirty-four holes $i$ are shown; but the gage will cut lumber thirty-six inches long.

If it is required to cut lumber longer than thirty-six inches, or than the length of the frame $D^2$ and plate $D^3$, the stop-plate $D^5$ is set at the extreme outer hole $i'$, and the set-screw $h$ loosened and the gage-plate adjusted outward on the plate $D^3$ to the required distance and the set-screw $h$ again set up. By this means the gage is adapted to be extended to nearly twice the length of the bracket $D^2$ or plate $D^3$, while at the same time not occupying normally more space than the length of the bracket. A hinged leg, F, will be attached to the outer end of the bracket $D^2$, adapted to be turned down to support the outer end of the bracket and gage, and folded up beneath the bracket when not in use.

The outer ends of the ears $d^3$ $d^4$ are extended, as shown at $d^5$, to form stops to strike against the bracket $D'$ when the gage is in operation, to prevent its being moved beyond a right-angled line to the table $A'$. If required, the pivots which connect the ears $d'$ $d^3$ and $d^2$ $d^4$ may be provided with nuts, by which the joints may be set rigidly.

In sawing-machines on which short lumber only is required to be sawed the gage-plate $D^4$ and plate $D^3$ might be formed in one piece, or the holes $i'$ formed in the plate $D^3$ and the stop-plate $D^5$ adapted to fit on the plate $D^3$.

Having thus described my invention, what I claim as new is—

1. In a sawing-machine, the combination of a saw-table and a rest attached to said table and projecting beyond the edge of the same, along which edge the saw travels, the projecting part of said rest being provided with a recess, $b'$, parallel with the edge of the table, into which recess the edge of the saw runs, the part of said projection beyond the recess also constituting a rest for the work, and said projection being provided with a horizontal projecting lip, $b^3$, extending inward, upon which the work rests, whereby the work is supported and held on both sides of the path of the saw, substantially as set forth.

2. In a sawing-machine, the combination, with the saw-table $A'$ and rest C, of an adjustable gage consisting of a plate, $D^4$, having a series of holes, $i'$, at equal intervals, a stop-plate, $D^5$, having perforations $i^2$ and stop-pins $E'$ $E^2$, and adapted to be moved along said gage-plate, substantially as set forth.

3. In a sawing-machine, the combination, with table $A'$, saw $A^3$, and rest C, of a bracket, $D'$, gage-frame $D^2$, hinged to said bracket, plate $D^3$, adjustably connected to said frame $D^2$, gage-plate $D^4$, having perforations $i'$, and adjustably connected to said plate $D^3$, and a stop-plate, $D^5$, having perforations $i^2$ $i^3$ and stop-pins $E'$ $E^2$, and adapted to be adjusted along said gage-plate, as and for the purpose set forth.

In testimony whereof I have hereunto set my hand in the presence of two subscribing witnesses.

JOHN HISKEY PALM.

Witnesses:
FRED B. LATHROP,
W. H. ADAMSON.